(12) United States Patent
Hansch

(10) Patent No.: US 6,199,929 B1
(45) Date of Patent: Mar. 13, 2001

(54) SIDEBOARD BRACKET

(76) Inventor: Ronald D. Hansch, P.O. Box 547, Wadena, MN (US) 56482

( * ) Notice: Subject to any disclaimer, the term of this patent is extended or adjusted under 35 U.S.C. 154(b) by 0 days.

(21) Appl. No.: 09/490,728

(22) Filed: Jan. 25, 2000

(51) Int. Cl.$^7$ ................................................ B62D 27/00
(52) U.S. Cl. ................................ 296/36; 296/32; 296/10; 296/6
(58) Field of Search ............................ 296/32, 36, 10, 296/184, 3–6

(56) References Cited

U.S. PATENT DOCUMENTS

| | | | |
|---|---|---|---|
| 616,528 | * 12/1898 | Fielder | 296/10 |
| 753,292 | * 3/1904 | McMurry | 296/36 |
| 912,430 | * 2/1909 | Smither | 296/32 |
| 939,005 | 11/1909 | Goedeke . | |
| 1,037,122 | 8/1912 | Buffinger et al. . | |
| 1,322,122 | 11/1919 | Landis . | |
| 1,475,078 | 11/1923 | Messacar . | |
| 1,704,883 | 3/1929 | Cullinan . | |
| 1,787,598 | 1/1931 | Smith . | |
| 1,828,684 | * 10/1931 | Scarlett | 296/36 |
| 2,080,764 | * 5/1937 | Crawford | 296/10 |
| 2,413,362 | 12/1946 | Maxwell et al. . | |
| 2,993,727 | * 7/1961 | Zewiske | 296/32 |
| 4,032,242 | 6/1977 | Morris . | |
| 4,460,214 | 7/1984 | Kuhns . | |
| 4,826,237 | 5/1989 | Socha . | |
| 4,949,929 | 8/1990 | Kesselman et al. . | |
| 5,056,752 | 10/1991 | Krause . | |
| 5,071,185 | * 12/1991 | Schiele | 296/36 |
| 5,704,678 | * 1/1998 | Elwell et al. | 296/32 |
| 5,752,734 | * 5/1998 | Ward et al. | 296/32 |
| 5,761,866 | 6/1998 | Maylon . | |
| 5,772,271 | 6/1998 | Sanders . | |
| 5,839,772 | 11/1998 | Toole . | |
| 5,887,932 | * 3/1999 | Pier | 296/6 |
| 5,897,086 | 4/1999 | Condon . | |

* cited by examiner

Primary Examiner—Joseph D. Pape
Assistant Examiner—Kiran B. Patel
(74) Attorney, Agent, or Firm—Albert W Watkins

(57) ABSTRACT

A bracket that is suitable for attachment to the rails of a pick-up truck or dump truck cargo body has attachment holes that support two perpendicular rails in orthogonal arrangement with respect to a cargo box railing or surface. The brackets are readily formed from low cost materials and may be stamped and formed with a minimum number of processing steps using a preferred method of the invention. When used in combination with existing cargo and dump boxes and other cargo carrying vehicles, the brackets extend the utility of the vehicle and offer a faster recovery of capital.

9 Claims, 3 Drawing Sheets

US 6,199,929 B1

SIDEBOARD BRACKET

BACKGROUND OF THE INVENTION

1. Field of the Invention

The present invention pertains to truck bodies and tops generally, and more specifically to removable brackets in combination with removable boards or sidewall extensions. The brackets and boards extend the side wall vertical height of a cargo area, such as a truck body dump box or cargo box.

2. Description of the Related Art

Dump trucks, flat-bed trucks, pick-up trucks, trailers and various other cargo carrying vehicles have been designed, often with dimensions and features fairly specific to a particular cargo. These vehicles are quite expensive, but are limited to transporting one specific cargo. As a result, the cost of the vehicle is only recoverable through the transport of that one specific cargo. In many situations, these vehicles could have application for many more diverse types of cargo, but are limited by inadequate or completely missing sidewalls.

For example, a dump truck dumping bucket might typically be designed for an optimum load when hauling sand or gravel. The dump box for that load needs only be sufficiently deep to retain a full load of sand. Owing to the weight of sand, a relatively shallow box will typically suffice. Lower sides simplify the filling process, particularly when a skid steered machine or front-end loader is used to fill the dump truck. The back will often be gently sloped, to allow ready discharge of the sand. This type of box will be optimum for sand and gravel, but will not be able to carry bulkier and less dense materials, such as loose vegetative or plant matter, owing to the limited height of the side walls of the box.

However, the same dump truck could be used to transport less dense materials, such as various grains or plant matter, if the dump box were sufficiently enclosed to retain the plant matter. Several artisans have disclosed techniques for retrofitting an existing vehicle, to expand the cargo that may be transported. Ward et al in U.S. Pat. No. 5,752,734, incorporated herein by reference, illustrate a set of side and back rails or walls, extending above a pick-up truck box, made from special slotted brackets. Wooden rails or plywood panels are inserted into the bracket slots, thereby forming a special purpose rack. While the Ward et al invention does expand the utility of an existing pick-up box, the rails are restrictive, limiting the sizes and types of lumber that may be used. Furthermore, the racks are relatively large and expensive to produce, and have little utility where a relatively dense load is to be carried, owing to their disproportionate height.

Sanders, in U.S. Pat. No. 5,772,271 incorporated herein by reference, illustrates a dump truck body including small tracks that support solid and see-through panel sections. Nevertheless, the Sanders invention, like the Ward et al invention, is limited by special tracks that necessitate a particular thickness insert. Furthermore, the Sanders invention is designed to be built into the truck body at the time of manufacture, and so cannot be retrofit onto existing special purpose vehicles already on the road. Similar extensions are illustrated in U.S. Pat. No. 4,826,237 to Socha, incorporated herein by reference. Krause in U.S. Pat. No. 5,056,752, also incorporated herein by reference, illustrates a flat bed trailer, with four corner brackets that can be positioned for a particular load, to provide bracing at the base of the load. However, this limited bracing provides little expansion in the type of cargo that may be carried, and instead merely simplifies the process of anchoring the load onto the trailer.

Other trailer and vehicle bodies are known in the art that provide no way to attach any sort of side board. Exemplary of this type of trailer is a hydraulic dumping trailer with sloping side walls. The top rails are smooth and void of attachment points or anchors.

What is needed then, and which is absent from the prior art, is a way to simply and cost-effectively retrofit an existing cargo vehicle to expand the type of cargo that may be transported by the vehicle.

SUMMARY OF THE INVENTION

In a first manifestation, the invention is a plurality of sideboard brackets for mounting supporting planks of varying or diverse thickness onto a transport vehicle having a dump box. The brackets rigidly support the planks in an orthogonal orientation while also supporting a load. They also allow dumping of material from the transport vehicle, between ones of the sideboard brackets. A front bracket has a corner point where three orthogonal planar surfaces converge, including a first vertical wall and a second vertical wall. The vertical walls include attachment points, to which supporting planks may be rigidly mounted. A third orthogonal surface comprises a horizontal base forming an "L" shape having first and second legs and further comprises attachment points for attachment to the transport vehicle. A tailgate bracket also has a corner point where three orthogonal planar surfaces converge, including a first vertical wall and a second vertical wall and further comprising attachment points to which supporting planks may be rigidly mounted. A third orthogonal planar surface comprises a horizontal base which extends farther parallel to the vehicle longitudinal axis than transverse, and comprises attachment points for attachment to the transport vehicle.

In a second manifestation, the invention is a means for removably attaching diverse load extending supports to a cargo box, to permit carrying diverse cargo while optimizing the loading, unloading and transport of each diverse cargo type. A first vertical surface has an attachment point for attachment to a plank. A second vertical surface perpendicular to the first vertical surface has an attachment point for attachment to a plank. A base has an attachment point for attachment to a cargo box.

In a third manifestation, the invention is a method for elevating the side walls and top rail of a dump truck body, comprising the steps of forming a first bracket from a sheet stock having three orthogonal surfaces including a base and two vertical side walls; rigidly and removably attaching the first bracket to the top rail; rigidly attaching a first plank at a first end to a first one of the two vertical side walls; anchoring the first plank against movement relative to the top rail; rigidly and removably attaching a second plank to a second one of the two vertical sidewalls; and removably anchoring the second plank against movement relative to the sidewalls.

OBJECTS OF THE INVENTION

A first object of the invention is to provide a way to convert an existing cargo carrier of limited cargo types into a carrier that can carry many more diverse materials. A second object of the invention is to provide a bracket that can be used with diverse railings and wall materials, without regard to thickness. A third object of the invention is the provision of a means for extending the side walls of a dump truck, without interfering with the dumping operation. A further object of the invention is to provide a sturdy bracket that may be manufactured with minimal expense. An additional object of the invention is to provide the bracket with a geometry that allows for compact storage and shipping, thereby simplifying the inventorying and distribution of the invention. These and other objects of the invention are achieved in the preferred embodiment, which will be best understood from the following text in association with the drawing figures.

DESCRIPTION OF THE PREFERRED EMBODIMENT

Figure 1:
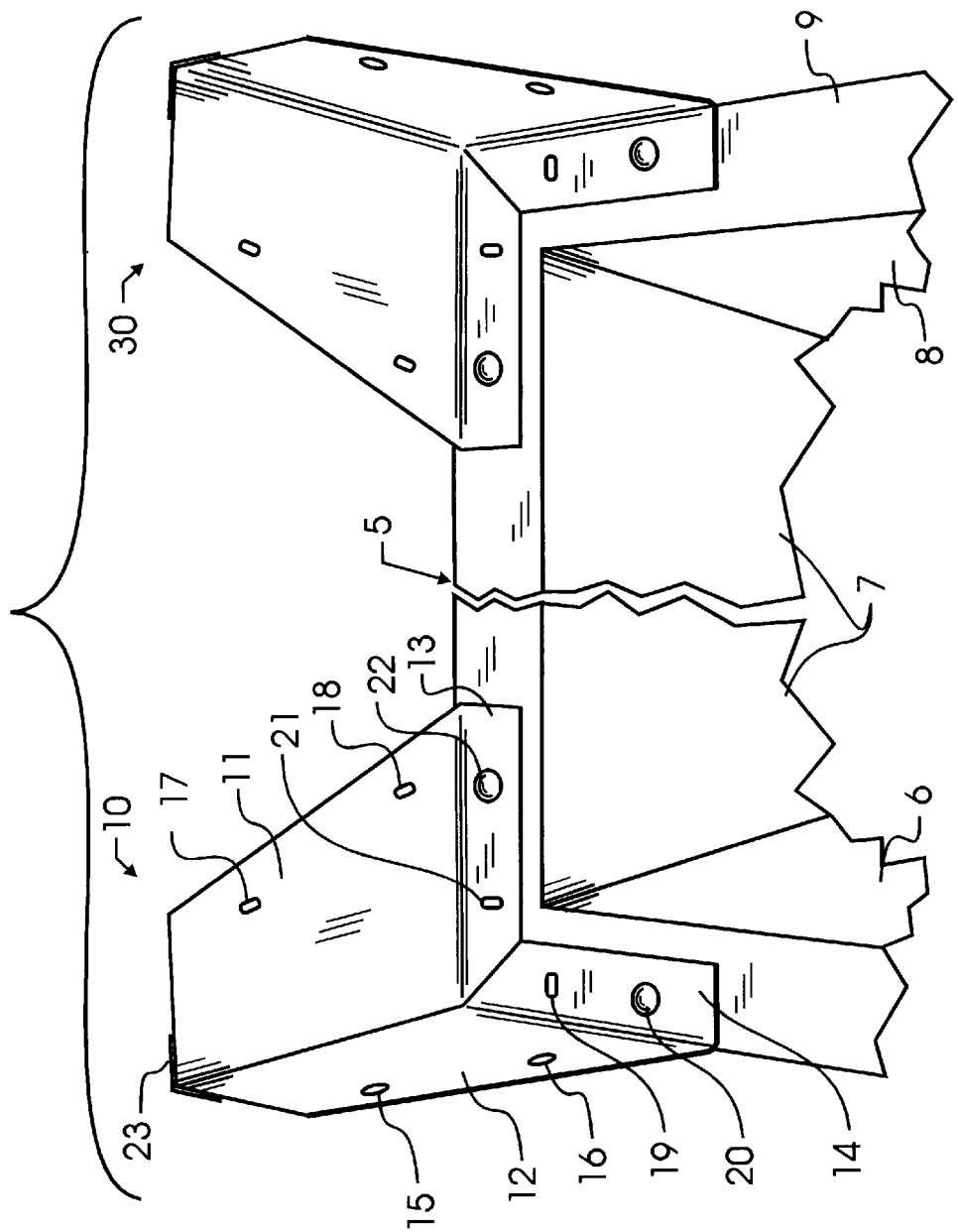
FIG. 1 illustrates a preferred embodiment combination of front brackets with a cargo box such as a pick-up truck from a projected view.

A dump box, pick-up box or the like is illustrated generally as 5 in FIG. 1, and has vertical side walls 6 and 8 and a front wall 7. A top perimeter of the box which will be referred to herein as the top rail 9 is also shown. The exact geometry of the dump box 5 is not critical to the performance of the invention, and so, for example, top rail 9 may be flat and horizontal as illustrated, or may, for example, be some combination of more elaborate geometrical shapes. Regardless of the exact geometry, for the purposes of this disclosure this surface will be referred to herein simply as top rail 9.

Mounted onto top rail 9 are two front brackets 10 and 30. Bracket 30 is identical to bracket 10, and so, while illustrated herein, bracket 30 will not be separately described with regard to individual components. Bracket 10 includes a first vertical wall 11 which extends transverse to dump box 5 and a second vertical wall 12 which extends longitudinally with dump box 5. An "L" shaped base is provided which has two legs 13 and 14, both which are designed to mount adjacent to top rail 9. In the most preferred embodiment illustrated, the side walls 11, 12 and base 13, 14 are each orthogonal to each other, meaning that they each are in perpendicular planes. While it is not critical to the invention that these walls and base are exactly perpendicular, and so some variation will be understood to be permitted herein, the invention offers widest application where these surfaces are substantially orthogonal. Holes 19 and 21 are illustrated, though these holes are normally filled with bolts, screws or similar fasteners such as fasteners 20 and 22. Through these combinations of holes and fasteners, it is relatively simple to attach or, if desired and through the appropriate selection of fastener, remove bracket 10 from top rail 9. Brackets 10 and 30 may therefore be readily attached to existing vehicles or to newly manufactured cargo vehicles. Holes 15–18 are provided to facilitate attachment of support planks such as lumber or plywood strips, sheet or metal plate, or other extensions as may be desired to extend interior box walls 6–8 vertically. As may be appreciated, these extensions, which will hereinafter be referred to as planks, may take on a variety of geometries, thicknesses, compositions and continuities as desired, without interfering with the operation of the invention. As a result, the present invention accommodates a very wide variety of materials for use in association with the inventive brackets. The planks will most preferably extend between brackets, such as from bracket 10 to bracket 30 being supported against vertical wall 11 and the associated vertical wall on bracket 30, thought again there is no requirement for use of each bracket. In some instances, it is conceivable that the dump box or cargo box will already have a support or ready attachment point in place, thereby alleviating the necessity for one or more of the inventive brackets. Once again, due to the lack of restriction on the dimensions of the plank, a wide variety of supporting surfaces may be accommodated. For additional reinforcement, angle iron 23 may also be provided if desired at the juncture between vertical walls 11 and 12. In a preferred embodiment, brackets 10 and 30 are constructed from three components, including two stamped pieces of sheet metal. The first piece becomes vertical wall 11 and base 13, while the second piece becomes vertical wall 12 and base 14. These two pieces may be joined through welding or may be adhered with angle iron 23, which in turn will most preferably be welded to each vertical wall 11, 12. In an alternative embodiment, brackets 10 and 30 may be punched and formed from a single piece of sheet steel and then, if desired, reinforced with angle iron 23.

Figure 2:
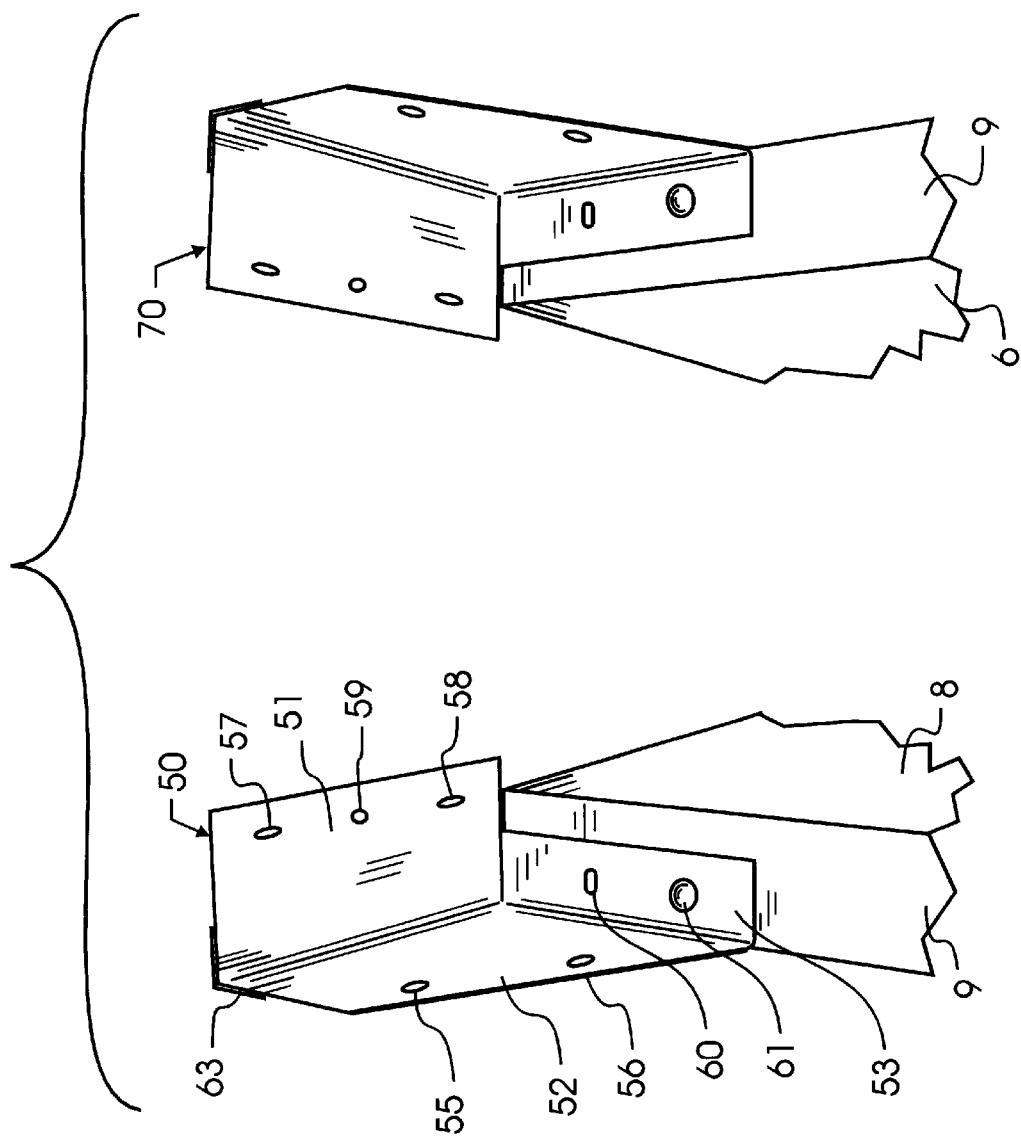
FIG. 2 illustrates a preferred embodiment combination of tailgate brackets with the tailgate portion of a cargo box from a projected view.

Tailgate brackets 50 and 70 of the preferred embodiment are shown mounted to top rail 9 above dump box side walls 8 and 6 respectively, in FIG. 2. Tailgate bracket 70 is a mirror image of tailgate bracket 50, and so will not be separately discussed herein, though one of ordinary skill in the art will readily be able to make and use bracket 50 based upon the description provided herein with reference to bracket 50. As is evident from the drawing figure, tailgate bracket 50 has a narrow elongate, generally rectangular base 53 which extends in the longitudinal direction of top rail 9 farther than transverse thereto. For illustrative purposes, a hole 60 is shown, though in practice this hole would be filled with a bolt or screw as shown at 61. Bracket 50 may then be attached and removed at will from top rail 9, but, when attached, will be securely held. A first vertical wall 52 extends both vertically and longitudinally parallel to top rail 9, and acts as a support for one end of a plank which will elevate top rail 9. The plank will also be extended longitudinally, most preferably in the preferred embodiment to bracket 30 of FIG. 1. Holes 55 and 56 are provided therein to accommodate fasteners which may be used to either permanently or removably attach the plank to vertical wall 52. Holes 57–59 are provided in second vertical wall 51, and these holes are used to removably attach a plank or end-gate to bracket 50. Second vertical wall 51 most preferably does not extend significantly beyond top rail 9. This is most preferred, since, during the dumping operations, the cargo contents of the dump body will most preferably pass unhindered and relatively unobstructed between brackets 50 and 70.

Figure 3:
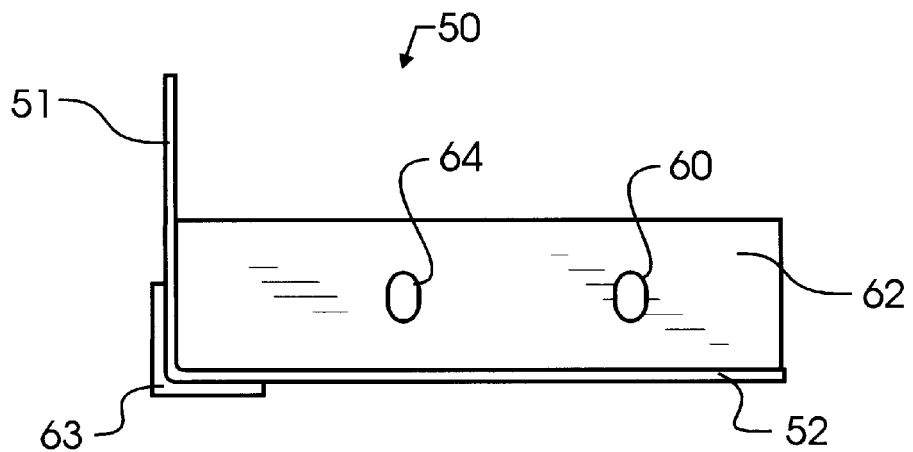
FIG. 3 illustrates one of the preferred tail gate brackets of FIG. 2 from a top view.
Figure 4:
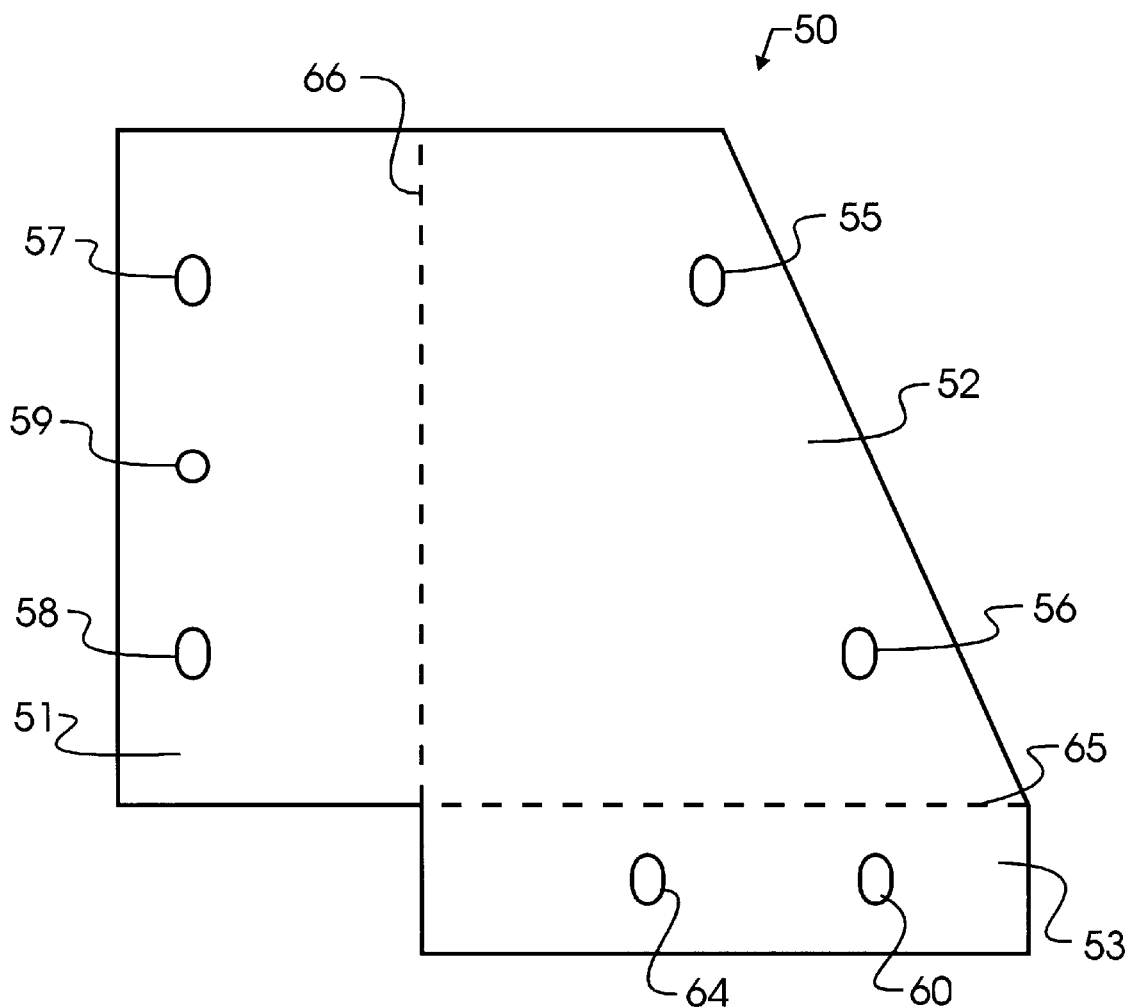
FIG. 4 illustrates the preferred tail gate bracket of FIG. 3 in a preliminary fabrication stage, showing the preferred forming process.

FIG. 3 illustrates bracket 50 from a top view, and so the relative dimensions of base 62 and vertical wall 51 are more apparent therefrom. Once again, a corner brace 63 may also be provided, if so desired. FIG. 4 illustrates a flat drawing of bracket 50, prior to bracket 50 being formed. Dashed lines 65 and 66 illustrate bending lines that will yield a bracket 50 as shown in the other drawing figures. From FIG. 4 it will be apparent to those skilled in the art that the preferred brackets 10, 30, 50 and 70 may readily be manufactured through a standard sheet metal stamping operation with either only a few steps in the operation, or with a progressive die which is capable of forming the brackets in a single press cycle. The benefit of using this sheet metal stock is achieved in manufacturing costs for relatively high volumes of parts, where the materials and production time are then minimal. Other materials and construction techniques may be used and have been conceived of herein, including such techniques as molding the brackets from durable materials such as plastics, drilling, laser cutting, etc. However, as aforementioned, the preferred embodiment offers much cost advantage during production.

One facet of the present invention is the simplicity of use and resultant low cost of application for the end user. This is best understood by considering the steps involved. First, a sheet stock material is stamped and formed into brackets 10, 50 and 70. Next, the brackets, owing to the simple geometry, may be readily stacked into a small, compact stack for transport. The brackets, as a result, occupy little space in a warehouse or upon a store room floor or shelf. Next, the brackets are purchased and once again occupy little space in a garage or workshop. When required, brackets 10, 30, 50 and 70 are rapidly affixed to a dump body top rail 9, simply by bolting or screwing the brackets into place. Next, planks are bolted onto or otherwise fastened between the brackets. If desired, the dumping side of the box may also be blocked, by the inclusion of a plank having geometry complementary to the open dumping edge. The cargo will then be loaded into the dump box, potentially up to or even above the newly added planks and brackets. The cargo will then be transported, and finally, if a tail-gate plank has been used, the tail gate plank will be removed and the contents dumped or otherwise removed therefrom. When a different type of cargo is to be hauled that does not require the elevated side boards, the brackets 10, 30, 50 and 70 may be readily removed and placed into storage. Labor is minimal, and the need for major capital investment in multiple vehicles and storage space for those vehicles is eliminated.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

I claim:

1. In combination a plurality of sideboard brackets for mounting supporting planks of varying or diverse thickness onto a transport vehicle having a dump box and rigidly supporting said planks in an orthogonal orientation relative to each other and a dump box top rail while supporting a load against said supporting planks and said brackets when said dump box is in a transport position and further allowing dumping of said load from said transport vehicle between ones of said plurality of sideboard brackets when said dump box is in a dumping position, comprising:

a front bracket having a corner point where three orthogonal planar surfaces converge, a first one of said three orthogonal planar surfaces comprising a first vertical wall extending vertically and longitudinally of said transport vehicle and a second one of said three orthogonal planar surfaces comprising a second vertical wall extending vertically and transverse of said transport vehicle, said first and second ones of said three orthogonal planar surfaces further comprising attachment points to which said supporting planks may be rigidly mounted, said third orthogonal planar surface comprising a horizontal base forming an "L" shape having first and second legs, said first leg which extends longitudinally farther than in a transverse direction and said second leg which extends farther transversely than longitudinally, said third orthogonal planar surface further comprising attachment points for attachment to said transport vehicle; and a tailgate bracket having a corner point where three orthogonal planar surfaces converge, a first one of said three orthogonal planar surfaces comprising a first vertical wall having a height, a width parallel to said vehicle longitudinal axis and a thickness, a second one of said three orthogonal planar surfaces comprising a second vertical wall having a height and a width transverse to said vehicle and a thickness, said first and second ones of said three orthogonal planar surfaces further comprising attachment points to which said supporting planks may be rigidly mounted, said third orthogonal planar surface comprising a horizontal base which extends farther parallel to said vehicle longitudinal axis than transverse, said third orthogonal planar surface further comprising attachment points for attachment to said transport vehicle.

2. The plurality of sideboard brackets of claim 1 wherein said dump box further comprises a means to force said load out of said dump box from a first edge of said dump box at a trailing longitudinal edge, and wherein said tailgate brackets are immediately adjacent said trailing longitudinal edge.

3. The plurality of sideboard brackets of claim 2 wherein said tailgate bracket second vertical wall width is less than said tailgate bracket first vertical wall width.

4. The plurality of sideboard brackets of claim 3 wherein said tailgate bracket second vertical wall width is comparable to a width of said top rail of said transport vehicle dump box, whereby said load may be dumped from said dump box unobstructed by said tailgate bracket.

5. The plurality of sideboard brackets of claim 1 further comprising a second front bracket of identical geometry to said front bracket, said front bracket and said second front bracket rigidly and removably attached at a first top front corner and a second top front corner of said dump box.

6. The plurality of sideboard brackets of claim 1 further comprising a second tailgate bracket which is geometrically a mirror image of said tailgate bracket, said tailgate bracket and said second tailgate bracket rigidly and removably attached at a first rear corner and a second rear corner of said dump box.

7. The plurality of sideboard brackets of claim 1 further comprising a supporting tailgate plank removably attached to said tailgate bracket and said second tailgate bracket, said supporting tailgate plank blocking discharge of said dump box.

8. A means for removably attaching diverse load extending supports to a cargo box to permit carrying diverse cargo within said cargo box while optimizing the loading, unloading and transport of each diverse cargo type, comprising:

a first vertical surface having an attachment point therein for attachment to a plank;

a second vertical surface perpendicular to said first vertical surface and extending in a direction normal to said first surface by an amount equal to an amount said first surface extends normal to said second vertical surface, said second vertical surface having an attachment point therein for attachment to a plank; and a base which extends in a direction normal to said first surface by an amount equal to an amount said base extends normal to said second vertical surface and has a first leg and a second leg each of generally rectangular configuration having a length and a width, said length being greater man said width, and said length of said first leg being perpendicular to said length of said second leg, said base having an attachment point therein for attachment to said cargo box.

9. A means for removably attaching diverse load extending supports to a cargo box to permit carrying diverse cargo within said cargo box while optimizing the loading, unloading and transport of each diverse cargo type, comprising:

a first vertical surface having an attachment point therein for attachment to a plank;

a second vertical surface perpendicular to said first vertical surface and extending in a direction normal to said first surface by an amount less than an amount said first surface extends normal to said second vertical surface, said second vertical surface having an attachment point therein for attachment to a plank; and a base which extends in a direction normal to said first surface by an amount less than an amount said second vertical surface extends normal to said first vertical surface and has a generally rectangular configuration having a length and a width, said length being greater than said width, and said length extending normal to said second vertical surface, said base having an attachment point therein for attachment to said cargo box.

* * * * *